(12) United States Patent
Wiedemann et al.

(10) Patent No.: US 12,502,838 B2
(45) Date of Patent: Dec. 23, 2025

(54) METHODS AND APPARATUS FOR ADDITIVE MANUFACTURE OF A WORKPIECE

(71) Applicant: Carl Zeiss Industrielle Messtechnik GmbH, Oberkochen (DE)

(72) Inventors: Bernhard Wiedemann, Rottenburg (DE); Dominik Schmid, Aalen (DE); Marius Haeusele, Aalen (DE); Heiko Degen, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 393 days.

(21) Appl. No.: 18/162,456

(22) Filed: Jan. 31, 2023

(65) Prior Publication Data
US 2023/0166457 A1 Jun. 1, 2023

Related U.S. Application Data

(63) Continuation of application No. PCT/EP2021/070754, filed on Jul. 23, 2021.

(30) Foreign Application Priority Data

Jul. 31, 2020 (DE) .......................... 102020120319.5

(51) Int. Cl.
*B29C 64/393* (2017.01)
*B29C 64/245* (2017.01)
(Continued)

(52) U.S. Cl.
CPC .......... *B29C 64/393* (2017.08); *B29C 64/245* (2017.08); *B33Y 10/00* (2014.12); *B33Y 30/00* (2014.12); *B33Y 50/02* (2014.12)

(58) Field of Classification Search
CPC ..... B29C 64/245; B29C 64/393; B33Y 10/00; B33Y 30/00; B33Y 50/02; B22F 10/38;
(Continued)

(56) References Cited

U.S. PATENT DOCUMENTS

| 5,155,321 A | 10/1992 | Grube |
| 6,815,636 B2 | 11/2004 | Chung |
| (Continued) | | |

FOREIGN PATENT DOCUMENTS

| CN | 109968671 A | 7/2019 |
| DE | 102013217422 A1 | 3/2015 |
| (Continued) | | |

OTHER PUBLICATIONS

Wegner A, Witt G et al. Ursachen für mangelnde Reproduzierbarkeit beim Laser-Sintern von Kunststoffbauteilen, RTejournal-Forum für Rapid Technologie, vol. 2013; https://www.rtejournal.de/ausgabe 10/3818.

(Continued)

*Primary Examiner* — Chun Cao
(74) *Attorney, Agent, or Firm* — Miller Johnson

(57) ABSTRACT

A method for additively manufacturing a workpiece having lateral workpiece dimensions includes obtaining a first data set defining the workpiece in layers arranged on top of the other. The method includes providing a manufacturing platform having lateral platform dimensions that are greater than the lateral workpiece dimensions. The method includes providing a structuring tool movable relative to the manufacturing platform. The method includes selecting an individual manufacturing region on the manufacturing platform. The method includes obtaining a second data set that represents individual layer deformations that are dependent on the selected manufacturing region. The method includes producing a defined material layer of the workpiece in the (Continued)

manufacturing region by controlling the structuring tool using the first and second data sets. The method includes repeating the producing in order to produce further defined material layers one on top of the other using the first data set and the second data set.

19 Claims, 5 Drawing Sheets

(51) Int. Cl.
  *B33Y 10/00* (2015.01)
  *B33Y 30/00* (2015.01)
  *B33Y 50/02* (2015.01)

(58) Field of Classification Search
  CPC .......... B22F 10/39; B22F 10/85; C01B 13/02; C01B 13/0274
  USPC ....................................................... 700/118
  See application file for complete search history.

(56) References Cited

U.S. PATENT DOCUMENTS

| | | | |
|---|---|---|---|
| 9,205,691 B1* | 12/2015 | Jones | B33Y 30/00 |
| 9,522,426 B2 | 12/2016 | Das | |
| 10,220,566 B2 | 3/2019 | Bauza | |
| 2015/0061170 A1* | 3/2015 | Engel | B33Y 10/00 |
| | | | 425/135 |
| 2016/0096326 A1 | 4/2016 | Naware | |
| 2017/0239721 A1* | 8/2017 | Buller | B23K 26/032 |

FOREIGN PATENT DOCUMENTS

| | | |
|---|---|---|
| EP | 3208077 A1 | 8/2017 |
| WO | 2018064349 A1 | 4/2018 |
| WO | 2018234331 A1 | 12/2018 |
| WO | 2019206903 A1 | 10/2019 |
| WO | 2020094732 A1 | 5/2020 |

OTHER PUBLICATIONS

Chinese Office Action for CN202180058314.5 dated Mar. 27, 2025, 26 pages.

* cited by examiner

METHODS AND APPARATUS FOR ADDITIVE MANUFACTURE OF A WORKPIECE

CROSS-REFERENCE TO RELATED APPLICATIONS

This application is a continuation of PCT International Application No. PCT/EP2021/070754 filed Jul. 23, 2021, which claims priority to German Patent Application No. DE 10 2020 120 319.5 filed Jul. 31, 2020. The entire disclosures of the above applications are incorporated by reference.

FIELD

The present disclosure relates to methods and apparatus for additively manufacturing one or more workpieces in a layer by layer fashion on a manufacturing platform.

BACKGROUND

Additive methods for manufacturing workpieces are sometimes referred to as 3D printing. There are various additive manufacturing methods. In what is known as selective laser sintering (SLS) or selective laser melting (SLM), what is known as a powder bed having a plurality of two-dimensionally spread powder particles is used. Frequently, these are metallic powder particles. However, they can also be plastic particles or polymers, for example made of polyamide (PA) or polymethyl methacrylate (PMMA). Selected powder particles in the powder bed are partially and/or completely melted with the aid of one or more laser beams or electron beams and thereupon joined together. In what is known as binder jetting, a powdery starting material is adhesively bonded at selected points using a liquid binder. In this way, a desired workpiece layer can be manufactured selectively in the powder bed in each case. After the manufacturing of such a workpiece layer, a new powder layer is spread over the powder bed and a further workpiece layer can be selectively manufactured. Overall, the workpiece is thus built up layer by layer from workpiece layers arranged one on top of the other. In other additive methods for manufacturing workpieces, a workpiece material can be applied selectively on a manufacturing platform in order to manufacture a workpiece layer by layer. The workpiece material can be, for example, a molten plastic.

The manufacturing platform typically has lateral dimensions that are greater than the lateral dimensions of the workpiece to be manufactured so that the manufacturing platform can support the workpiece during the manufacture without overhang. Consequently, an individual manufacturing region on the manufacturing platform must at least implicitly be selected for each workpiece when a manufacturing process is initiated.

U.S. Pat. No. 10,220,566 B2 discloses a method and an apparatus additive manufacturing and proposes the measurement of selected material layers in the course of the process in order to make appropriate adaptations in dependence thereon during the manufacturing of the subsequent workpiece layers. In this way, manufacturing errors can be detected early and be corrected in the course of the process.

WO 2019/206903 A1 discloses a further method for additively manufacturing a workpiece and a corresponding apparatus, wherein dimensional and/or geometric properties of a workpiece layer are measured in the course of the process in order to improve the accuracy and reproducibility of the manufacturing process.

WO 2018/064349 A1 discloses a method for additively manufacturing a workpiece, wherein what are known as model markers are added to the CAD data of the workpiece. Together with the manufacture of the workpiece, physical markers are produced. Deviations between the positions of the model markers in the CAD data and the positions of the physical markers in a 3D scanner image are determined in order to produce corrected print commands.

WO 2018/234331 A1 discloses a method and an apparatus for additively manufacturing a workpiece, wherein measurement results at the workpiece are compared with the results of a simulation of the measurement.

WO 2020/094732 A1 discloses a method and an apparatus for inspecting the surface of a powder bed in order to obtain workpiece layers that are as homogeneous as possible during the additive manufacture of a workpiece and to avoid cracks, pores, dents etc.

The publication by Wegner A, Witt G (2013), Ursachen für eine mangelnde Reproduzierbarkeit beim Laser-Sintern von Kunststoffbauteilen (Causes of a lack of reproducibility during laser sintering of plastic components), RTejournal-Forum für Rapid Technologie, vol. 2013, retrievable from https://www.rtejournal.de/ausgabe10/3818, discloses that the inhomogeneous temperature control during the manufacturing process during laser sintering of plastic components may be a cause of a lack of reproducibility and size accuracy. It proposes a new temperature control system which is intended to provide more homogeneous temperature and cooling conditions.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Against this background, it is an object of the present invention to provide methods and apparatus for additively manufacturing at least one workpiece on a manufacturing platform with improved accuracy.

It is another object to provide methods and apparatus for additively manufacturing a plurality of workpieces with improved reproducibility.

It is yet another object to provide methods and apparatus for additively manufacturing a plurality of workpieces in a cost-effective manner.

According to a first aspect, there is provided a method for additively manufacturing a workpiece having lateral workpiece dimensions, comprising the steps of:
a) obtaining a first data set defining the workpiece in a plurality of workpiece layers arranged one on top of the other,
b) providing a manufacturing platform having lateral platform dimensions that are greater than the lateral workpiece dimensions,
c) providing a structuring tool movable relative to the manufacturing platform,
d) selecting an individual manufacturing region on the manufacturing platform, wherein the individual manufacturing region represents a section of the manufacturing platform on which the workpiece is intended to be manufactured in a layer by layer fashion, e) obtaining a second data set, which represents individual layer deformations that are dependent on the selected manufacturing region, f) producing a defined material layer of the workpiece in the manufacturing region on the manufacturing platform by controlling the structuring tool using the first data set and the second data set, and g) repeating step f) in order to produce further defined material layers one on top of the other using the first data set and the second data set.

According to a further aspect, there is provided a method for additively manufacturing a workpiece having lateral workpiece dimensions, comprising the steps of:

a) obtaining a first data set defining the workpiece in a plurality of workpiece layers arranged one on top of the other, b) selecting a manufacturing region on a manufacturing platform having lateral platform dimensions that are greater than the lateral workpiece dimensions, wherein the manufacturing region defines a section of the manufacturing platform on which the workpiece is intended to be manufactured layer by layer, c) producing a defined material layer in the manufacturing region on the manufacturing platform by using the first data set, wherein a defined workpiece layer from the plurality of workpiece layers arranged one on top of the other is produced with the material layer, and d) repeating step c), wherein further defined workpiece layers from the plurality of workpiece layers arranged one on top of the other are produced, wherein, before step c), a second data set is obtained, which represents a deformation of the defined material layer that is dependent on the manufacturing region, and the defined material layer is produced using the first data set and using the second data set.

According to yet a further aspect there is provided an apparatus for additively manufacturing at least one workpiece having lateral workpiece dimensions, comprising a manufacturing platform having lateral platform dimensions that are greater than the lateral workpiece dimensions, such that a plurality of individual manufacturing regions are available for manufacturing the at least one workpiece on the manufacturing platform, comprising a structuring tool movable relative to the manufacturing platform, comprising a first memory configured to obtain a first data set that defines the at least one workpiece in a plurality of workpiece layers arranged one on top of the other, comprising a second memory configured to obtain a second data set, and comprising a control unit configured to move the structuring tool relative to the manufacturing platform using the first data set and the second data set in order to produce, step by step, a plurality of material layers in a selected one of the plurality of manufacturing regions on the manufacturing platform, wherein each material layer from the plurality of material layers forms a defined workpiece layer from the plurality of workpiece layers, and wherein the second data set represents an individual deformation of the defined workpiece layers dependent on the respectively selected manufacturing region.

Particularly advantageously, the methods are implemented with the aid of one or more computer programs comprising program code which can be executed on a control unit of an apparatus of the afore-mentioned type.

The new methods and the new apparatus are based on the finding that the individual manufacturing region on the manufacturing platform may lead to an individual deformation of the additively manufactured material layers, that is a deformation dependent on the selected manufacturing region. The individual deformation leads to dimensional and/or geometric deviations of the manufactured workpiece layer in comparison with the target dimensions of the workpiece layer that result from the first data set. Consequently, the size accuracy of an additively manufactured workpiece can depend on the respectively selected individual manufacturing region on the manufacturing platform. The new method and the corresponding apparatus use a second data set that represents spatially dependent deformations, in particular spatially dependent dimensional and/or geometric deviations in comparison with the respective target dimensions of the additively manufactured workpiece layers in the manufacturing volume on the manufacturing platform. In some example embodiments, the second data set can represent spatially dependent deformations of the additively manufactured material layers in each case in three mutually orthogonal spatial directions. Advantageously, the respective three mutually orthogonal spatial directions can include two orthogonal spatial directions parallel to the manufacturing platform and a third spatial direction perpendicular to the manufacturing platform. In some preferred example embodiments, the second data set can therefore represent spatially dependent deformations of the additively manufactured material layers with respect to a plurality of spatial volumes (voxels) in the manufacturing volume on or above the manufacturing platform.

The individual deformations that are dependent on the respective manufacturing region can have various causes. These include inhomogeneous temperature distributions and/or temperature profiles within the manufacturing volume. For example, lateral delimitation walls at the manufacturing platform, which serve to delimit a powder bed, can influence the temporal and spatial temperature profile within the manufacturing volume in a manner such that, depending on the distance of a manufacturing region from the lateral delimitation walls, a higher or lower process temperature, a faster or slower heating and/or a faster or slower cooling occurs. The number and lateral distances of a plurality of workpieces manufactured at the same time on the manufacturing platform can also influence the temporal and spatial temperature distribution. Moreover, the precision with which the structuring tool is movable relative to the manufacturing platform can vary in dependence on the respective manufacturing region on the manufacturing platform. The new method and the corresponding apparatus make it possible to take into account such spatially dependent process variations early in the manufacturing process and to possibly carry out necessary process corrections. Such a correction can be carried out, if desired, in addition to other measures that serve to improve the reproducibility and size accuracy of additively manufactured workpieces, such as the early inspection of a powder bed before the respective structuring of a workpiece layer. The second data set can be provided and obtained in some example embodiments without major modifications in terms of the hardware of apparatuses that are already used. Therefore, the new method can in some cases also be implemented cost-effectively on apparatuses already being used, in particular with the aid of the afore-mentioned computer program. Correspondingly, the new method and the corresponding apparatus make an advantageous contribution to improving the size accuracy and reproducibility of additively manufactured workpieces in a cost-effective manner. The above-mentioned object is achieved in its entirety.

In a preferred refinement, the defined material layer is produced with the aid of a structuring tool that is moved relative to the manufacturing platform by using the first data set and by using the second data set.

In this refinement, the process for manufacturing a defined material layer, as is initially the result of the first data set, is modified by using the second data set in order to in this way counter spatially dependent individual deformations of the defined material layer. The modification is integrated, so to speak, in a conventional process flow. Depending on the manufacturing region selected in each case, the structuring tool is moved relative to the manufacturing platform with in part different movement parameters than without the second data set. The structuring tool can be, for example, a laser beam, an electron beam, a melting head, a hot air nozzle or another tool, with the aid of which a workpiece layer can be manufactured selectively on a manufacturing platform. The other or modified movement parameters can include a faster or slower movement of the structuring tool relative to the manufacturing platform, a modified trajectory and/or modified, different process temperatures. The configuration makes it possible to implement the new method for a plurality of workpieces in a cost-effective manner.

In a further refinement, a plurality of workpieces of the same type are manufactured at the same time in a plurality of manufacturing regions on the manufacturing platform in a combined manufacturing process, wherein process parameters that are individually modified for each of the workpieces are determined and used by using the second data set.

With this refinement, a plurality of workpieces of the same type can be manufactured with high efficiency and size accuracy in a highly cost-effective manner.

In a further refinement, the first data set is modified using the second data set in order to produce a modified first data set, wherein the structuring tool is moved relative to the manufacturing platform depending on the modified first data set.

In some preferred example embodiments, the first data set includes CAD data of the workpiece to be manufactured. Said CAD data can be modified in the present refinement by using the second data set in a manner such that the workpiece layers that are actually manufactured in a manufacturing region have the desired size accuracy and reproducibility. One could say, the CAD data are distorted individually and in dependence on the manufacturing region by using the second data set, with the result that an individually modified CAD data set is available for each manufacturing region. The workpiece layers are manufactured in dependence on the selected manufacturing region on the manufacturing platform with the CAD data set that is in each case modified individually. The refinement has the advantage that the spatially dependent correction of the workpiece layers can take place "very early on" in the manufacturing process and largely independently of the hardware of the apparatus used. The new method and the new apparatus can therefore be very easily and cost-effectively implemented and be retrofitted in already existing apparatuses. With particular advantage, the modification of the first data set can take place entirely before the manufacturing step c).

In a further refinement, first control signals are determined in dependence on the first data set, and the structuring tool is moved relative to the manufacturing platform using the control signals, wherein the first control signals are modified in dependence on the second data set in order to produce modified control signals, and wherein the structuring tool is moved relative to the manufacturing platform in dependence on the modified control signals.

In this refinement, which can be used alternatively or additionally to the previously mentioned refinement, the correction of the spatially dependent individual deformations is achieved with the aid of modified control signals. In particular, these may be control signals with which the structuring tool is controlled. The refinement is particularly advantageous if the control of the structuring tool already takes place with the use of individual calibration data, in other words if various control signals are produced from a defined CAD data set in dependence on the apparatus used and/or the current environment parameters. In some example embodiments of this refinement, the structuring tool is moved relative to the manufacturing platform with closed-loop control, and the modification of the first control signals can include the modification of a drive current or operating voltage.

In a further refinement, before step c), a plurality of defined test objects are produced layer by layer distributed spatially on the manufacturing platform, wherein the second data set is determined with the aid of the plurality of defined test objects.

In this refinement, the deformation of the defined material layers that is dependent on the manufacturing region is determined on the basis of the layers of the test objects. The configuration enables a rather simple and efficient determination of the second data set for a plurality of manufacturing regions. In some preferred example embodiments, a plurality of second data sets are determined, which differ in terms of the number and distribution of the test objects in the manufacturing volume. For example, a first plurality of second data sets can be determined, wherein in each case a test object is manufactured at a different manufacturing region on the manufacturing platform. The first plurality of second data sets consequently represent spatially dependent deformations of the material layers for those cases in which in each case only one workpiece is manufactured in a manufacturing process. In a further step, a second data set can be determined, in which a plurality of test objects are manufactured on the manufacturing platform at the same time. In this case, the second data set represents spatially dependent deformations of the material layers and in addition the dependence of the spatially dependent deformations on the coverage of the manufacturing platform and/or the utilization of the manufacturing volume. In some advantageous example embodiments, a plurality of second data sets are obtained, which represent a plurality of different manufacturing scenarios, wherein the different manufacturing scenarios differ in terms of the number and spatial distribution of test objects within the manufacturing volume. Advantageously, it is then possible for the additive manufacturing of a specific workpiece to select in each case that second data set from the plurality of second data sets that comes closest to the current manufacturing scenario with respect to the number and distribution of workpieces. The configuration enables a significant improvement of size accuracy and reproducibility during the additive manufacturing of workpieces.

In a further refinement, the plurality of defined test objects in each case have a defined longitudinal extent perpendicular to the manufacturing platform.

In this refinement, the defined test objects can advantageously have a rod-shaped element in each case, which rod-shaped element is manufactured on the manufacturing platform layer by layer from the bottom up. The refinement makes it possible to determine spatially dependent variations in the course of the process sequence in a rather simple and efficient manner. Since the accumulated thermal input into the workpiece to be manufactured increases with an increasing number of workpiece layers and, moreover, density changes due to crystallization may occur, it is possible for varying spatially dependent deformations to occur in the course of the layer sequence. The use of test objects with in each case a defined longitudinal extent enables the determination of such variations after the removal of the test objects from the manufacturing platform in a rather simple and efficient manner.

In a further refinement, the plurality of defined test objects each has a defined longitudinal extent parallel to the manufacturing platform.

In this refinement, the test objects in each case can advantageously have rod-shaped elements that extend substantially parallel to the manufacturing platform. In some example embodiments, the defined test objects have rod-shaped elements that span one or more planes parallel to the manufacturing platform. In some example embodiments, the test objects include structures with rods that extend orthogonally to one another and of which some extend parallel to the manufacturing platform and at least one further rod extends perpendicular to the manufacturing platform. This refinement enables in a simple and efficient manner the determination of spatially dependent deformations parallel to the manufacturing platform and—in preferred example embodiments—in three mutually orthogonal spatial directions. The second data set can thus be determined for a plurality of individual spatially dependent deformations in a simple and efficient manner. The size accuracy and reproducibility of the workpieces can be improved for a plurality of manufacturing regions and process parameters.

In a further refinement, the plurality of defined test objects in each case are manufactured with an individual coding representing a respective manufacturing region on the manufacturing platform, wherein the second data set is determined by using the individual codings.

In this refinement, the defined test objects differ from one another to the extent that it is readily possible to determine the respective manufacturing region on the basis of the respective test object. The individual coding can include, for example, elevations or depressions, which code information in relation to the respective manufacturing region on the manufacturing platform in the manner of a barcode or QR code. In further refinements, a plurality of test objects can be manufactured with a common holding structure, wherein the respective position of a test object within the common holding structure codes the respective manufacturing region. The refinement makes it easier to determine the second data set and contributes to an efficient implementation of the new method and the new apparatus.

In a further refinement, the plurality of defined test objects in each case are measured using a measurement device in order to determine individual test object dimensions, wherein the second data set is determined in dependence on the test object dimensions.

In some preferred example embodiments, the second data set is determined in dependence on the test object measurements in an automated manner. Advantageously, the individual codings can be correlated to the individual test object dimensions. In some example embodiments, the measurement device can be an integrated measurement device of the new apparatus. In other example embodiments, the measurement device can include a stationary or mobile 3D scanner, with which the defined test objects are measured after their removal from the manufacturing platform. In some advantageous example embodiments, the test objects can be placed in a special test object holder, which ensures a defined and reproducible test object position during the measurement. The individual test object measurements can be compared with target dimensions of the test objects, in particular in the form of CAD data, in order to determine the individual spatially dependent deformations of the workpiece layers. The refinement makes it possible to very efficiently determine the second data set or very efficiently determine a plurality of second data sets representing a plurality of spatially dependent deformations and process scenarios.

In a further refinement, the manufacturing region on the manufacturing platform is selected in dependence on the second data set.

In some example embodiments of this refinement, the selection of the manufacturing region can include that, from a plurality of second data sets, a specific second data set is selected that comes closest to the actual manufacturing scenario for the workpiece to be manufactured with respect to the workpiece dimensions and/or the number of workpieces to be manufactured at the same time. In dependence on the selected second data set, it is then possible for the manufacturing region on the manufacturing platform to be selected that promises particularly great size accuracy and/or reproducibility for the current manufacturing scenario. The design advantageously contributes to the improvement of the size accuracy and reproducibility of additively manufactured workpieces, since the individual placement and spatial distribution of the workpieces to be manufactured can be optimized in a simple manner.

In a further refinement, the workpiece is measured after the manufacture using a measurement device in order to determine individual workpiece dimensions, wherein the second data set is modified in dependence on the individual workpiece dimensions.

In this refinement, the second data set is determined on the basis of real workpieces from earlier manufacturing processes. Information relating to the size accuracy of the workpiece manufactured according to the new method are thus taken into account for the manufacturing of future workpieces and in particular returned to a future manufacturing process in the manner of a closed loop. The refinement contributes to the establishment of an adaptive and self-optimizing manufacturing process. This has the advantage that changes in process parameters even over longer periods are taken into account and, overall, great size accuracy and reproducibility are achieved over long production time periods.

In a further refinement, the defined material layer in step c) is solidified with the aid of the structuring tool.

In this refinement, the structuring tool is configured to selectively bind together and thus solidify flowable and/or pourable materials, such as in particular metal powders or plastic particles. The refinement therefore relates to methods and apparatuses for additively manufacturing workpieces, in which the individual workpiece layers can take almost any desired shapes. In such methods, spatially dependent deformations can occur to a particular degree. The refinement makes a contribution towards achieving a great size accuracy and reproducibility of the workpieces in methods such as in particular selective laser sintering and selective laser melting.

It is to be understood that the features mentioned above and yet to be explained are usable not only in the respectively stated combination, but also in other combinations or alone, without departing from the scope of the present invention.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
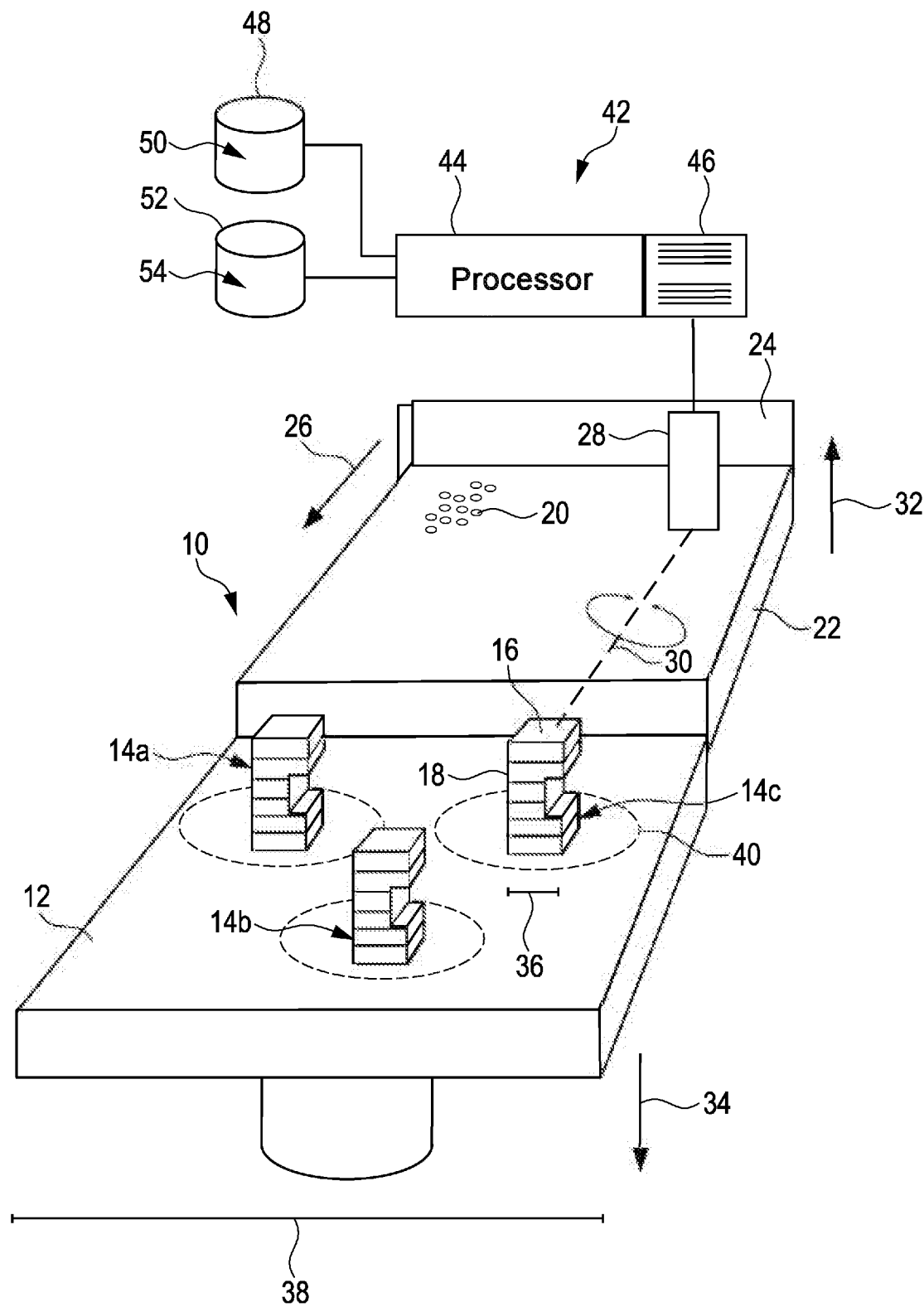
FIG. 1 is a schematic illustration of an example embodiment of the new apparatus with a plurality of workpieces to be manufactured.

In FIG. 1, an example embodiment of the new apparatus is denoted in its entirety by the reference sign 10. The apparatus 10 has a manufacturing platform 12, on which here workpieces 14, specifically three example workpieces 14a, 14b, 14c, are additively manufactured. The workpieces 14a, 14b, 14c are each built up layer by layer from the bottom up in temporally successive steps, wherein in each case a new material layer is manufactured on already existing workpiece layers. In FIG. 1, a currently uppermost material layer is denoted by the reference sign 16. A workpiece layer located further below is denoted by the reference sign 18.

In the illustrated example embodiment, the workpiece layers 18 are manufactured in each case from a powder material 20. The material 20 is located here in a reservoir 22 and can be spread from there over the manufacturing platform 12 using a layer-forming tool. In a simplified form, FIG. 1 shows a blade 24, which can be moved in the direction of arrow 26 in order to spread a new material layer 16 with powder material 20 over the manufacturing platform 12 and the already produced workpiece layers 18. The powder material 20 can then be selectively partially and/or completely melted with the aid of a structuring tool and in this way be solidified to form a new workpiece layer. In the example embodiment according to FIG. 1, the structuring tool includes a laser 28, which generates a laser beam 30. The laser beam 30 is movable relative to the manufacturing platform 12 and therefore relative to the material layers 16, as is indicated in FIG. 1 by way of an annular double-headed arrow. In order to simplify the manufacturing of a new material layer with the blade 24, the reservoir 22 can here be moved up in the direction of the arrow 32. Alternatively or additionally, the manufacturing platform 12 can be lowered in the direction of the arrow 34.

Typically, the non-solidified powder particles in such an apparatus 10 remain on the manufacturing platform 12 during the manufacturing process and form a largely closed powder bed, which for reasons of clarity is not illustrated here. The workpiece layers 18 of the workpieces 14 are embedded in the powder bed until the non-solidified powder material is removed from the manufacturing platform at the end of the manufacturing process and the workpieces 14 are freed. In particular when manufacturing workpieces made of plastic particles/polymers it is possible for the workpieces— in deviation from the illustration here—to be held in the powder bed without direct contact with the manufacturing platform 12.

In deviation from the example embodiment shown here, the apparatus 10 can in other example embodiments have an electron beam or a different structuring tool for manufacturing workpiece layers 18 selectively on the manufacturing platform 12. In some example embodiments, the material 20 includes metallic powder particles. In other example embodiments, the material 20 can include plastics particles, such as from polyamide. Moreover, the structuring tool can in other example embodiments locally selectively apply a workpiece material, for example in the manner of an inkjet printer or with the aid of a powder nozzle discharging a powdery material.

As is indicated in FIG. 1, the workpieces 14 each have a lateral workpiece dimension 36 that is smaller than a corresponding lateral platform dimension 38. The term "lateral dimension" here relates to a length and/or area transversely and in particular perpendicular to the layer stack of the workpiece layers 18 which grows upwards. Accordingly, the lateral dimensions can here be indications relating to lengths and/or areas.

Reference sign 40 indicates a manufacturing region on the manufacturing platform 12 in which here the workpiece 14c is manufactured layer by layer. Depending on the lateral workpiece dimensions of the workpiece to be manufactured, one or more manufacturing regions 40 can be defined on the manufacturing platform 12. As already indicated in the introductory part, the material layers 16 and the resulting workpiece layers 18 can have individual deformations depending on the respective manufacturing region 40 in which the layers are produced. The individual deformations can include dimensional deviations in the lateral direction, in the height (perpendicular to the manufacturing platform 12) and/or deviations in the flatness of the layers. The individual deformations can depend both on the lateral position of the respective manufacturing region 40 relative to the manufacturing platform 12 and also on the height of the respective layer relative to the manufacturing platform 12. In some cases, in particular the layer thickness can vary perpendicular to the manufacturing platform 12 in dependence on the respective manufacturing region 40. Correspondingly, example embodiments of the new method implement a correction mechanism for achieving a size accuracy and reproducibility of the workpieces 14 that are as uniform as possible.

The apparatus 10 includes in a manner known per se a control unit 42, which is illustrated here with a processor 44 and a controller 46. The controller 46 generates control signals and here controls in particular the movement of the laser beam 30 relative to the manufacturing platform 12. Moreover, the controller 46 can control the movements of the manufacturing platform 12 in the direction of the arrow 34, the movement of the reservoir 22 in the direction of the arrow 32, and/or the movement of the blade 24 in the direction of the arrow 26. In some example embodiments, the controller 46 includes one or more driver stages with which the laser 28 and various electrical drives (not illustrated here) are controlled. The processor 44 here represents a data processing unit, with the aid of which suitable control commands for the controller 46 and/or the stated driver stages are determined. In some example embodiments, the processor 44 can be implemented with the aid of a commercial PC, on which a suitable operating system, such as Windows, OSX, Linux and others is implemented. With the aid of the processor 44, a computer program (not illustrated here) is then executed to implement example embodiments of the new method with an apparatus according to FIG. 1.

Reference sign 48 denotes a first memory, in which a first data set 50 is stored. Reference sign 52 denotes a second memory in which a second data set 54 is stored. The memories 48, 52 can be internal memories or external memories of the data processing unit, which is illustrated here with the processor 44. For example, the memories 48, 52 can be storage regions of an internal working memory RAM of the data processing unit illustrated with the processor 44. Alternatively or additionally, the memories 48, 52 can be internal or external hard disk storage devices or storage regions on such a hard disk. In principle, the memories 48, 52 can also be hard disk storage devices that are connected to the processor 44 by a network connection, such as an Ethernet connection.

The first data set 50 in some preferred example embodiments is a CAD data set, which defines the workpiece to be manufactured in a plurality of successively arranged lateral workpiece layers 18. Alternatively or additionally, the first data set 50 can include generic CAD data that describe the workpiece to be manufactured in its entirety, that is to say without the lateral workpiece layers arranged one on top of the other. The processor 44 can then determine a corresponding data set with the plurality of lateral workpiece layers arranged one on top of the other on the basis of the first data set from the memory 48. In further example embodiments, the first data set can include reverse engineering data and/or data from a computed tomography scan, that is to say data that are acquired on an already existing pattern or real design template. In all preferred example embodiments, the first data set 50 defines the workpiece 14 to be manufactured with its target properties.

The second data set 54 represents an individual deformation of the defined material or workpiece layers that is dependent on the respective manufacturing region 40. It enables pre-emptive correction of the individual spatially dependent deformations in the course of the manufacturing process according to the example embodiments of the new method. In some advantageous example embodiments, the second data set 54 includes interpolation parameters that enable individual correction of the spatially dependent deformations even if a currently selected manufacturing region 40 does not exactly coincide with a manufacturing region that was captured previously on the basis of a test object.

Figure 2:
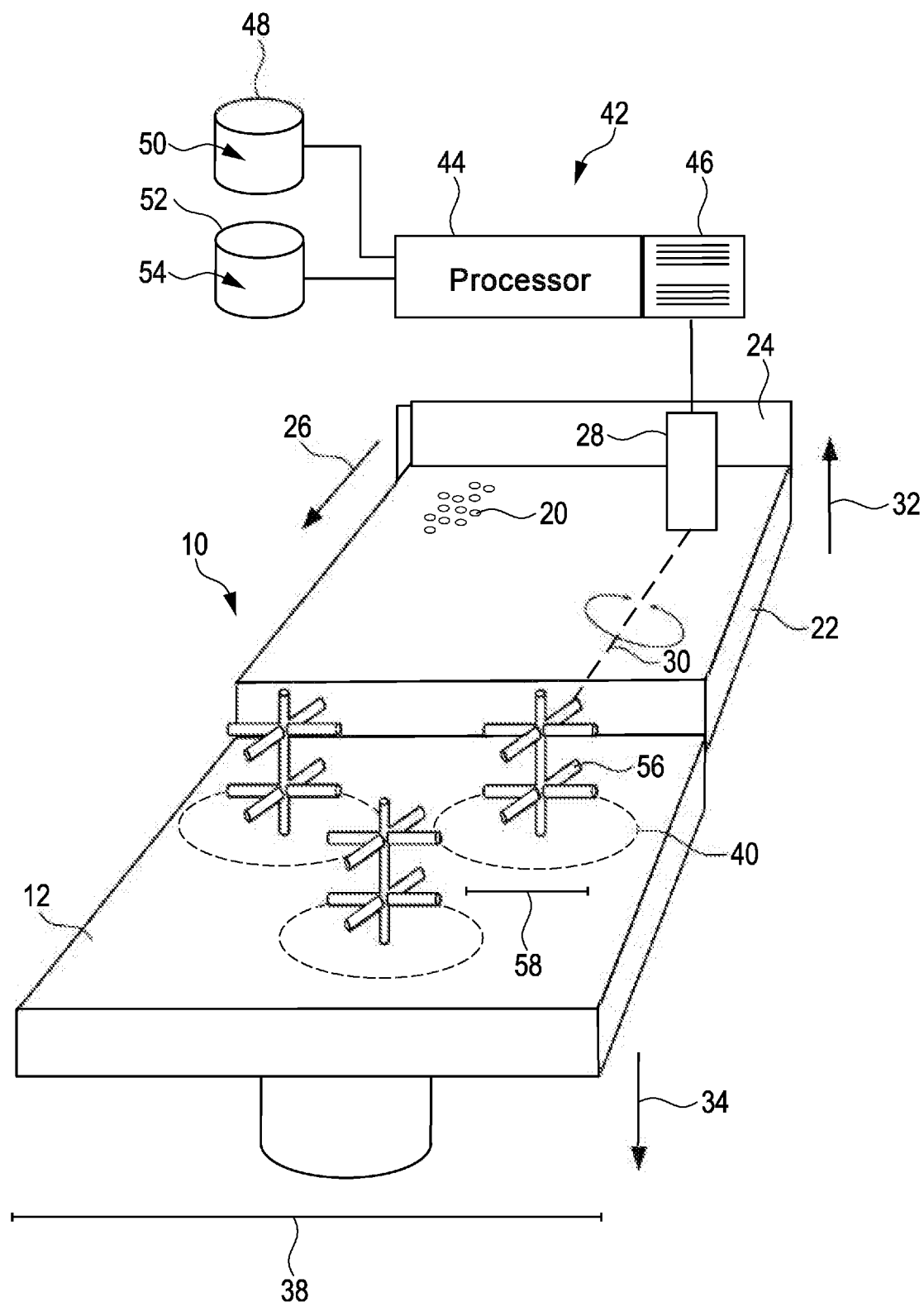
FIG. 2 is an apparatus from FIG. 1 with a plurality of defined test objects.

FIG. 2 shows an apparatus 10 from FIG. 1, wherein here, rather than the workpieces 14a, 14b, 14c, a plurality of defined test objects are manufactured in the manufacturing regions 40 on the manufacturing platform 12. The same reference signs denote the same elements as in FIG. 1. The test objects 56 can be used in the manner described below for determining the second data set 54. Advantageously, the defined test objects are manufactured in a manufacturing process that temporally precedes the manufacturing process of the workpieces 14, in principle in the same way as the workpieces 14, except that a current second data set 54 is available only after the manufacturing and measuring of the test objects 56. In particular, the test objects 56 are here built up layer by layer from the bottom up from a powdery material 20 with the aid of the laser beam 30.

Figure 3:
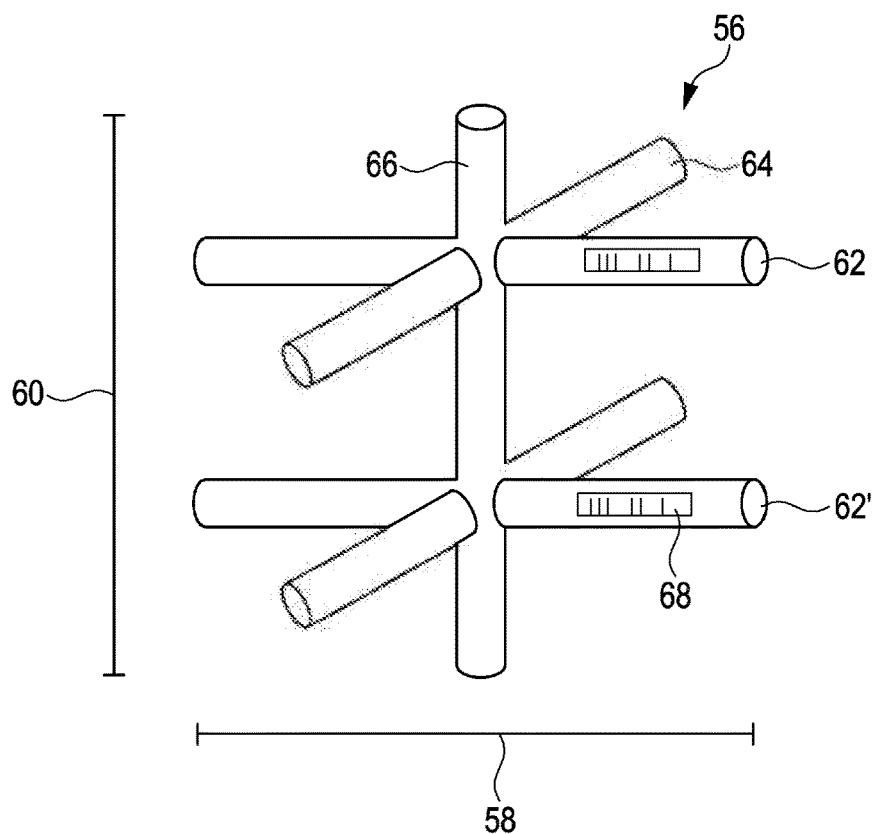
FIG. 3 is a schematic illustration of an example embodiment for a test object according to FIG. 2.

FIG. 3 shows an example embodiment of a test object from FIG. 2 in a somewhat larger illustration. The test object 56 here has a defined longitudinal extent 58 parallel to the manufacturing platform 12 and a defined longitudinal extent 60 perpendicular thereto. In preferred example embodiments, the test object 56 has rod-shaped elements 62, 64, 66, which extend in three mutually orthogonal spatial directions, wherein the rod-shaped elements 62 and 64 in this case extend parallel to the manufacturing platform 12, while the rod-shaped element 66 extends perpendicular thereto. The rod-shaped elements 62, 64, 66 each have a defined target dimension, which may be stored for example in CAD data in the first memory 48 (FIG. 2). The actual extents of the rod-shaped elements 62, 64, 66 typically depend on the target measurements in dependence on the respective manufacturing region 40. Using the respective differences between the actual dimensions and the respective target values, the individual spatially dependent deformations in the three spatial directions that are defined by the rod-shaped elements 62, 64, 66 can be determined. Accordingly, in preferred example embodiments of the new method, a plurality of test objects 56 can be manufactured, and subsequently measured, in a corresponding plurality of manufacturing regions 40 at the same time or temporally successively on the manufacturing platform 12 in order to determine the respective spatially dependent deformations. Advantageously, it is possible here not only to measure the longitudinal dimensions of the rod-shaped elements 62, 64, 66 but also the relative distances and/or angles of the rod-shaped elements 62, 64, 66 relative to one another. For example, the relative distance between the rod-shaped elements 62 and 62' can represent a spatially dependent deformation perpendicular to the manufacturing platform 12 in the course of the manufacturing process, even if the longitudinal extent 60 of the test object 56 lies in the range of the respective target value. This may be the case in particular if spatially dependent deformations of the defined material layers depend on the respective height of the material layer in the manufacturing volume and/or vary in the course of the manufacturing process.

In some example embodiments, the test objects 56 can be manufactured with a respective individual coding 68, which makes it possible to subsequently identify the respectively used manufacturing region 40 on the basis of the test object 56 itself.

Figure 4:
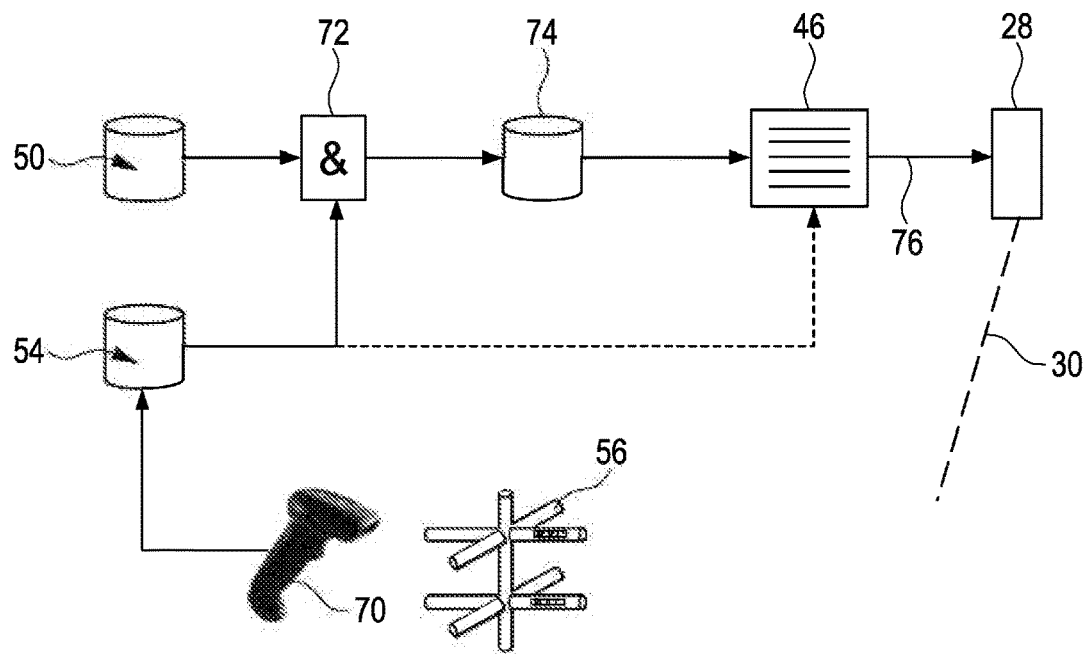
FIG. 4 is a schematic illustration to explain example embodiments of the new method and of the new apparatus.

As illustrated in FIG. 4, the test objects 56 are measured in preferred example embodiments of the new method according to the manufacturing using a measurement device 70 in order to determine the individual test object dimensions 58, 60 and the associated deviations from the target dimensions. The measurement data obtained are used to determine the second data set 54. In some example embodiments of the new method, the first data set 50, which represents for example CAD data of a workpiece 14 to be manufactured, can be modified by using the second data set 54, as is indicated at reference sign 72 in FIG. 4. Accordingly, in some example embodiments, a modified first data set 74 can be determined, which represents, as it were, an individual spatially dependent pre-deformation of the workpieces to be manufactured in dependence on the respectively selected manufacturing region. Subsequently, the modified first data set can be used to determine the control signals for controlling the structuring tool 28, 30. Alternatively or additionally, the second data set 54 can be used to determine modified control signals for the various manufacturing regions. In some example embodiments, the apparatus 10 can include the measurement device 70 as a mobile, for example handheld, 3D measurement device, or as a stationary measurement device. The modified first data set 74 and/or the modified control signals 76 is/are preferably determined automatically on the basis of the measurement data of a plurality of coded test objects 56, and on the basis of a respectively current first data set 50, representing a workpiece 14 to be manufactured. The modified first data set 74 and/or the modified control signals 76 can be determined with the aid of the processor 44 and/or can be performed in the controller 46.

Figure 5:
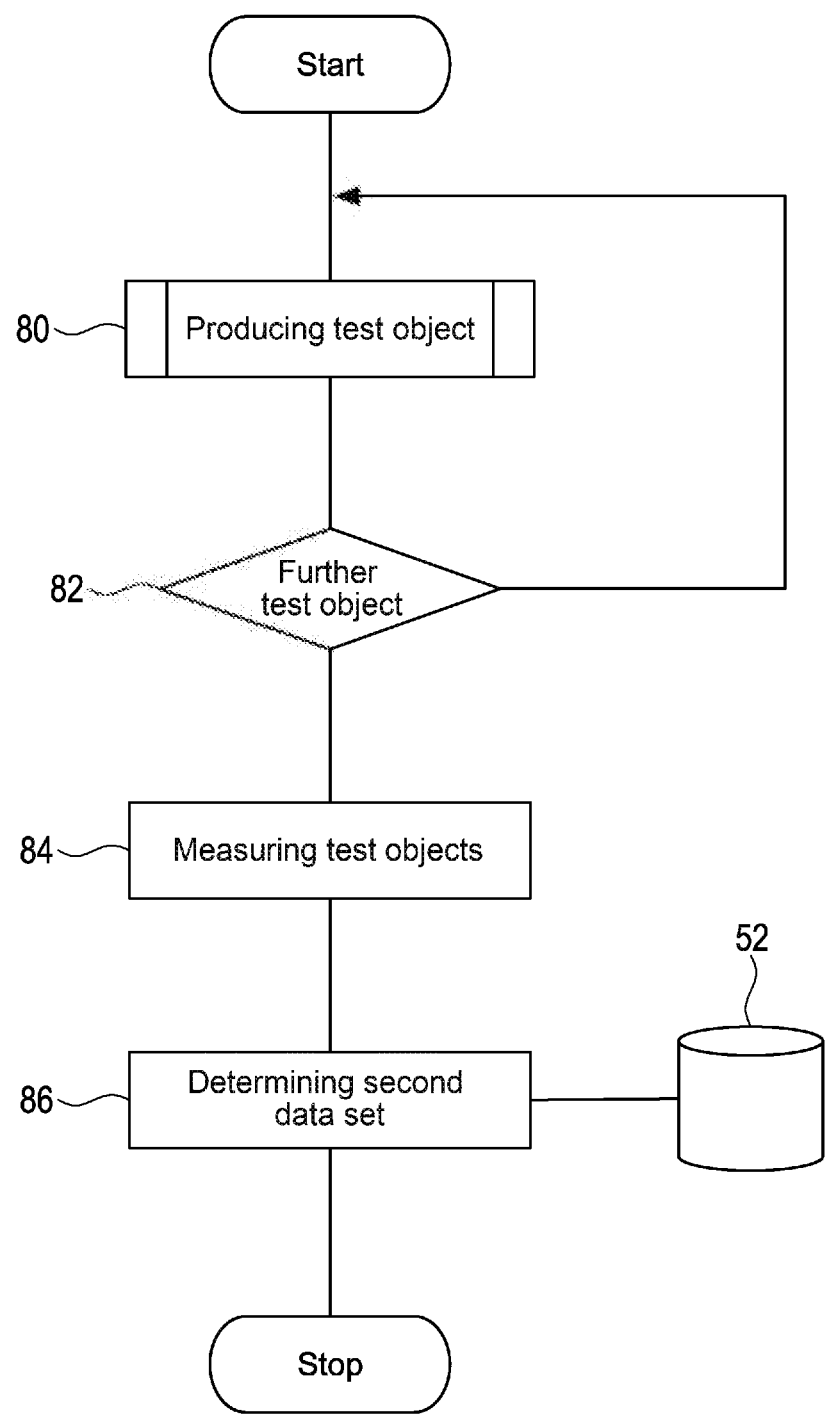
FIG. 5 is flowchart to explain an example embodiment of the new method.

Accordingly, example embodiments of the new method can include method steps as are illustrated in simplified form in FIG. 5. According to the steps 80, 82, test objects are manufactured in a plurality of manufacturing regions 40 on the manufacturing platform 12. According to step 80, an individual test object can be manufactured in a selected manufacturing region on the manufacturing platform 12, and then, according to step 82, a further test object can be manufactured in a different manufacturing region in a further manufacturing process. Alternatively or additionally, a plurality of test objects can be manufactured at the same time on the manufacturing platform in one manufacturing process. In preferred example embodiments, a plurality of test objects are manufactured in a plurality of manufacturing processes in a plurality of manufacturing regions, wherein the selection of the respective manufacturing regions and/or the coverage density of the test objects on the manufacturing platform 12 can vary from one manufacturing process to the other. Once all desired test objects were manufactured in steps 80, 82, the test objects are measured, according to step 84, in each case in order to determine the spatially dependent deformations of the respective material layers and/or deformations that depend on the coverage of the manufacturing platform. According to step 86, the information obtained is aggregated in the second data set and stored in the memory 52.

Figure 6:
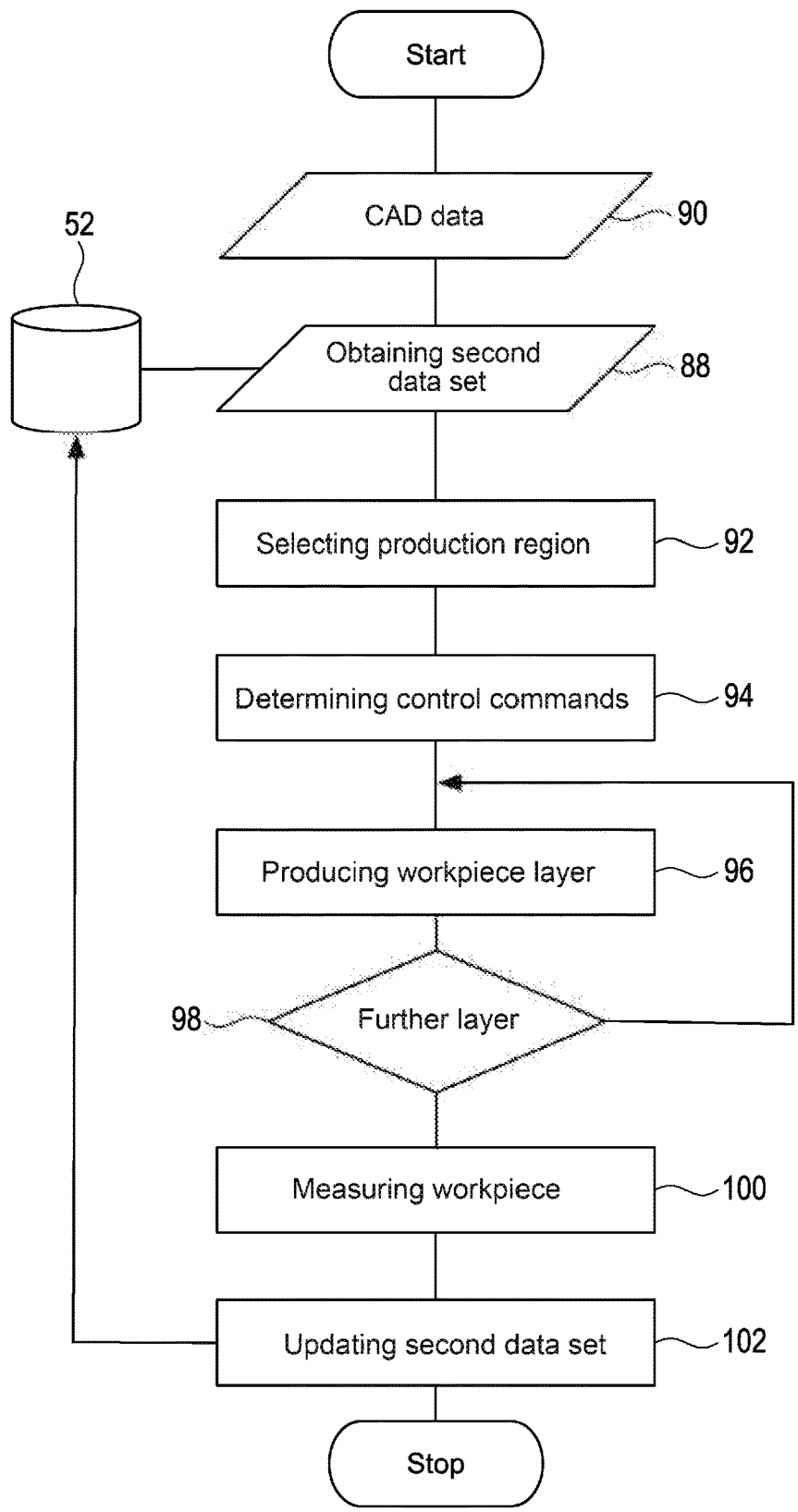
FIG. 6 is a further flowchart to explain an example embodiment of the new method.

As is illustrated in FIG. 6, preferred example embodiments of the new method and of the new apparatus use such a second data set that can be read according to step 88 from the memory 52. According to step 90, a first data set that can represent for example CAD data of a workpiece to be manufactured is also obtained. In some example embodiments, a manufacturing region for the workpiece to be manufactured is selected according to step 92 by using the second data set. In some example embodiments, it is possible for this purpose to select a suitable second data set from a plurality of second data sets that represent mutually differing manufacturing scenarios, with the suitable second data set coming closest to the manufacturing scenario for the actual workpiece 14 in relation to the number and/or size of the workpieces to be manufactured on the manufacturing platform. According to step 94, control signals for controlling the structuring tool are determined by using the second data set. The control signals include as it were a pre-deformation of the workpiece to be manufactured, which is selected such that the individual spatially dependent deformations of the material layers are compensated and the manufactured workpiece corresponds to the target data according to the first data set with a great size accuracy and reproducibility.

According to steps 96, 98, the workpiece is then produced layer by layer in successive workpiece layers. According to step 100, the manufactured workpiece is measured in some preferred example embodiments after the manufacturing in order to check the size accuracy and reproducibility. Depending on the measured individual workpiece dimensions, the second data set can be updated according to step 102, so that a corresponding updated second data set is obtained in future further manufacturing processes.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrases "at least one of A, B, or C" should be construed to mean a logical (A OR B OR C), using a non-exclusive logical OR, and should not be construed to mean "at least one of A, at least one of B, or at least one of C."

The invention claimed is:

1. A method for additively manufacturing a workpiece having lateral workpiece dimensions, the method comprising:
    obtaining a first data set defining the workpiece in a plurality of workpiece layers arranged one on top of the other;
    providing a manufacturing platform having lateral platform dimensions that are greater than the lateral workpiece dimensions;
    providing a structuring tool movable relative to the manufacturing platform;
    selecting an individual manufacturing region on the manufacturing platform, wherein the individual manufacturing region represents a section of the manufacturing platform on which the workpiece is intended to be manufactured in a layer by layer fashion;
    obtaining a second data set that represents individual layer deformations that are dependent on the selected manufacturing region;
    producing a defined material layer of the workpiece in the manufacturing region on the manufacturing platform by controlling the structuring tool using the first data set and the second data set; and
    repeating the producing in order to produce further defined material layers one on top of the other using the first data set and the second data set.

2. The method of claim 1 further comprising:
    prior to the obtaining the second data set, manufacturing a plurality of defined test objects layer by layer spatially distributed over the manufacturing platform,
    wherein the second data set is determined on the basis of the plurality of defined test objects.

3. The method of claim 1 wherein:
    a plurality of workpieces of same type are concurrently manufactured in a plurality of manufacturing regions on the manufacturing platform in one combined manufacturing process;
    individually modified process parameters for each of the plurality of workpieces are determined on the basis of the second data set; and
    the structuring tool is controlled depending on the individually modified process parameters.

4. A method for additively manufacturing a workpiece having lateral workpiece dimensions, the method comprising:
obtaining a first data set defining the workpiece in a plurality of workpiece layers arranged one on top of the other;
selecting a manufacturing region on a manufacturing platform having lateral platform dimensions that are greater than the lateral workpiece dimensions, wherein the manufacturing region defines a section of the manufacturing platform on which the workpiece is intended to be manufactured layer by layer;
producing a defined material layer in the manufacturing region on the manufacturing platform by using the first data set, wherein a defined workpiece layer from the plurality of workpiece layers arranged one on top of the other is produced with the material layer;
repeating the producing, wherein further defined workpiece layers from the plurality of workpiece layers arranged one on top of the other are produced; and
prior to the producing, obtaining a second data set that represents a deformation of the defined material layer that is dependent on the manufacturing region, wherein the defined material layer is produced using the first data set and using the second data set.

5. The method of claim 4 wherein the defined material layer is produced with the aid of a structuring tool moved relative to the manufacturing platform on the basis of the first data set and the second data set.

6. The method of claim 5 wherein:
the first data set is modified by using the second data set in order to produce a modified first data set, and
the structuring tool is moved relative to the manufacturing platform in dependence on the modified first data set.

7. The method of claim 4 wherein:
first control signals for controlling the structuring tool are determined in dependence on the first data set;
the first control signals are modified in dependence on the second data set to determine modified control signals; and
the structuring tool is moved relative to the manufacturing platform in dependence on the modified control signals in order to manufacture the workpiece in the selected manufacturing region.

8. The method of claim 4 wherein:
a plurality of workpieces of the same type are concurrently manufactured in different manufacturing regions on the manufacturing platform in one combined manufacturing process; and
individually modified process parameters for each of the plurality of workpieces are determined and used on the basis of the second data set.

9. The method of claim 4 further comprising:
prior to the producing, manufacturing a plurality of defined test objects spatially distributed over the manufacturing platform layer by layer,
wherein the second data set is determined on the basis of the plurality of defined test objects.

10. The method of claim 9 wherein the plurality of defined test objects each have a defined longitudinal extent perpendicular to the manufacturing platform.

11. The method of claim 9 wherein the plurality of defined test objects each have a defined longitudinal extent parallel to the manufacturing platform.

12. The method of claim 9 wherein:
the plurality of defined test objects each are manufactured with an individual coding representing a respective manufacturing region on the manufacturing platform; and
the second data set is determined using the respective individual coding of each of the plurality of defined test objects.

13. The method of claim 9 wherein:
the plurality of defined test objects are respectively measured using a measurement device in order to determine individual test object dimensions; and
the second data set is determined in dependence on the test object dimensions.

14. The method of claim 4 wherein the manufacturing region on the manufacturing platform is selected depending on the second data set.

15. The method of claim 4 wherein:
the workpiece is measured after the manufacturing using a measurement device in order to determine individual workpiece dimensions; and
the second data set is determined depending on the individual workpiece measurements.

16. The method of claim 4 wherein the defined material layer is solidified during the producing with the aid of a structuring tool.

17. An apparatus for additively manufacturing at least one workpiece having lateral workpiece dimensions, the apparatus comprising:
a manufacturing platform having lateral platform dimensions that are greater than the lateral workpiece dimensions, such that a plurality of individual manufacturing regions are available for manufacturing the at least one workpiece on the manufacturing platform,
a structuring tool movable relative to the manufacturing platform,
a first memory configured to obtain a first data set that defines the at least one workpiece in a plurality of workpiece layers arranged one on top of the other,
a second memory configured to obtain a second data set; and
a control unit configured to move the structuring tool relative to the manufacturing platform using the first data set and the second data set in order to produce, step by step, a plurality of material layers in a selected one of the plurality of manufacturing regions on the manufacturing platform,
wherein each material layer from the plurality of material layers forms a defined workpiece layer from the plurality of workpiece layers, and
wherein the second data set represents an individual deformation of the defined workpiece layers dependent on the respectively selected manufacturing region.

18. A non-transitory computer-readable medium comprising program code configured to carry out a method for additively manufacturing a workpiece having lateral workpiece dimensions on an apparatus having a manufacturing platform with lateral platform dimensions greater than the lateral workpiece dimensions, and having a structuring tool movable relative to the manufacturing platform, the method comprising:
obtaining a first data set defining the workpiece in a plurality of workpiece layers arranged one on top of the other;
selecting an individual manufacturing region on the manufacturing platform, wherein the individual manufacturing region represents a section of the manufacturing platform on which the workpiece is intended to be manufactured in a layer by layer fashion;

obtaining a second data set, which represents individual layer deformations that are dependent on the selected manufacturing region;

producing a defined material layer of the workpiece in the manufacturing region on the manufacturing platform by controlling the structuring tool using the first data set and the second data set; and repeating the producing in order to produce further defined material layers one on top of the other using the first data set and the second data set.

19. The method of claim 1 wherein:

obtaining the second data set includes obtaining a plurality of second data sets, each second data set of the plurality of second data sets represents a different manufacturing scenario of a plurality of different manufacturing scenarios, and obtaining the second data set includes selecting a data set from the plurality of second data sets that represents the different manufacturing scenario that is most similar to the workpiece.

* * * * *